US011776152B2

(12) United States Patent
Dou et al.

(10) Patent No.: US 11,776,152 B2
(45) Date of Patent: Oct. 3, 2023

(54) MOBILE APPARATUS OBSTACLE DETECTION SYSTEM, MOBILE APPARATUS, AND GROUND-SWEEPING ROBOT

(71) Applicant: JIAXING UPHOTON OPTOELECTRONICS TECHNOLOGY CO., LTD., Jiaxing (CN)

(72) Inventors: Chenhao Dou, Beijing (CN); Qingfeng Zhu, Beijing (CN); Jingli Yuan, Beijing (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 17/998,396

(22) PCT Filed: May 10, 2021

(86) PCT No.: PCT/CN2021/092819
§ 371 (c)(1),
(2) Date: Nov. 10, 2022

(87) PCT Pub. No.: WO2021/228048
PCT Pub. Date: Nov. 18, 2021

(65) Prior Publication Data
US 2023/0186507 A1   Jun. 15, 2023

(30) Foreign Application Priority Data

May 11, 2020   (CN) .......................... 202010391496.5

(51) Int. Cl.
*G06K 9/00*   (2022.01)
*G06T 7/70*   (2017.01)
(Continued)

(52) U.S. Cl.
CPC ............ *G06T 7/70* (2017.01); *A47L 11/4061* (2013.01); *G01S 7/4811* (2013.01); *G01S 17/46* (2013.01); *G01S 17/93* (2013.01); *G06T 7/521* (2017.01)

(58) Field of Classification Search
CPC ....................................... G06T 7/521
See application file for complete search history.

(56) References Cited

U.S. PATENT DOCUMENTS

2014/0267007 A1\* 9/2014 Capps ................... G06F 3/0418
345/156
2016/0378117 A1\* 12/2016 Szatmary ............. G06V 10/145
382/153
(Continued)

FOREIGN PATENT DOCUMENTS

CN    101101204 A    1/2008
CN    101210800 A    7/2008
(Continued)

OTHER PUBLICATIONS

International Search Report dated Jul. 26, 2021 from PCT Application No. PCT/CN2021/092819.

*Primary Examiner* — Hadi Akhavannik
(74) *Attorney, Agent, or Firm* — INNOVATION CAPITAL LAW; Vic Lin

(57) ABSTRACT

Provided is a mobile apparatus obstacle detection system (100), a mobile apparatus (10) carrying the obstacle detection system (100), and a ground-sweeping robot. The obstacle detection system (100) comprises: a structured light projection module (102) configured to project structured light onto the path of advance of the mobile apparatus (10), the structured light comprising at least one lateral detection line in the horizontal direction and at least one longitudinal detection line in the vertical direction; a camera module (103) configured to capture an image of the structured light (Continued)

(105); and an image processing module (104) configured to calculate, according to the image of the structured light (105), the distances and positions of obstacles (106, 107, 108) on the path of advance.

20 Claims, 6 Drawing Sheets

(51) Int. Cl.

| | | |
|---|---|---|
| *G06T 7/521* | (2017.01) | |
| *A47L 11/40* | (2006.01) | |
| *G01S 7/481* | (2006.01) | |
| *G01S 17/46* | (2006.01) | |
| *G01S 17/93* | (2020.01) | |

(56) References Cited

U.S. PATENT DOCUMENTS

| | | | |
|---|---|---|---|
| 2017/0197315 A1* | 7/2017 | Haegermarck | B25J 9/1692 |
| 2017/0300061 A1 | 10/2017 | Hickerson et al. | |
| 2017/0332872 A1* | 11/2017 | Jun | G06T 7/521 |
| 2017/0344013 A1* | 11/2017 | Haegermarck | A47L 9/0477 |
| 2018/0089616 A1* | 3/2018 | Jacobus | G06K 19/06037 |
| 2018/0149753 A1* | 5/2018 | Shin | G01S 7/4811 |
| 2019/0004537 A1* | 1/2019 | Haegermarck | G01C 21/343 |
| 2019/0130773 A1* | 5/2019 | Zhu | G05D 1/024 |

FOREIGN PATENT DOCUMENTS

| | | |
|---|---|---|
| CN | 202582535 U | 12/2012 |
| CN | 103884272 A | 6/2014 |
| CN | 105974427 A | 9/2016 |
| CN | 106289065 A | 1/2017 |
| CN | 106998984 A | 8/2017 |
| CN | 107995962 A | 5/2018 |
| CN | 108226939 A | 6/2018 |
| CN | 109839628 A | 6/2019 |
| CN | 110353583 A | 10/2019 |
| CN | 210464466 U | 5/2020 |
| CN | 111562567 A | 8/2020 |

* cited by examiner

MOBILE APPARATUS OBSTACLE DETECTION SYSTEM, MOBILE APPARATUS, AND GROUND-SWEEPING ROBOT

TECHNICAL FIELD

The disclosure generally relates to the technical field of obstacle detection, and in particular, to an obstacle detection system based on structured light, a mobile apparatus including the obstacle detection system, and a ground-sweeping robot.

BACKGROUND

As an important constituent part of a smart home, ground-sweeping robots have appeared in the lives of thousands of households. A ground-sweeping robot needs a 3D vision function, including instant positioning, distance measurement, map construction, obstacle avoidance, and recognition of an obstacle in the direction of travel, such as a table, a chair, a sofa, a cabinet, or a home appliance. In the existing technology, the ground-sweeping robot usually carries a plurality of sensors to implement the 3D vision function, and may also project structured light through a diffractive optical element DOE (Diffractive Optical Element), and then implement obstacle recognition and obstacle avoidance by using a camera and a recognition algorithm.

Structured light is a system structure composed of a projection apparatus and a camera. Specific optical information is projected by the projection apparatus onto the surface and background of an object, and then is collected by the camera. Information such as the position and depth of the object is calculated according to the change of an optical signal caused by the object, and then the entire three-dimensional space is restored.

An existing solution for obstacle avoidance with structured light in a ground-sweeping robot usually cannot recognize a suspension space below furniture such as a sofa or a cabinet, causing the ground-sweeping robot to be stuck at the suspension space; or cannot recognize a shorter obstacle on the forward path of the ground-sweeping robot; or possibly cannot accurately recognize an elongated obstacle in the vertical direction, such as a chair leg.

The contents in the Background are only technologies known by the disclosers, and do not necessarily represent the existing technology in the field.

SUMMARY

In view of at least one of the defects in the existing technology, the disclosure provides an obstacle detection system for a mobile apparatus, including:

a structured light projection module configured to project structured light on a forward path of the mobile apparatus, the structured light including at least one lateral detection line in a horizontal direction and at least one longitudinal detection line in a vertical direction;

a camera module configured to capture an image of the structured light; and an image processing module configured to calculate a distance and a position of an obstacle on the forward path according to the image of the structured light.

According to an aspect of the disclosure, the structured light projection module projects a first lateral detection line according to a first preset angle range, projects a first longitudinal detection line according to a second preset angle range, the first longitudinal detection line being located above the first lateral detection line, and projects a second longitudinal detection line according to a third preset angle range, the second longitudinal detection line being located below the first lateral detection line and on an extension line of the first longitudinal detection line.

According to an aspect of the disclosure, one end point of the second longitudinal detection line intersects with the first lateral detection line, and the first longitudinal detection line is spaced from the second longitudinal detection line.

According to an aspect of the disclosure, the structured light projection module projects a first lateral detection line according to a first preset angle range, projects a first longitudinal detection line according to a second preset angle range, the first longitudinal detection line being located above the first lateral detection line, and projects a second lateral detection line according to a fourth preset angle range, the second lateral detection line being located below and parallel to the first lateral detection line.

According to an aspect of the disclosure, the structured light projection module projects a first lateral detection line according to a first preset angle range, projects a first longitudinal detection line according to a second preset angle range, projects a second longitudinal detection line according to a third preset angle range, and projects a second lateral detection line according to a fourth preset angle range, wherein the first longitudinal detection line and the second longitudinal detection line are aligned to each other and connected together, the second lateral detection line intersects with a lower end point of the second longitudinal detection line and is parallel to the first lateral detection line.

According to an aspect of the disclosure, the first longitudinal detection line is located at a lateral center of the first lateral detection line, and the structured light projection module further projects a third longitudinal detection line and a fourth longitudinal detection line, the third longitudinal detection line and the fourth longitudinal detection line being parallel to and disposed symmetrically relative to the first longitudinal detection line.

According to an aspect of the disclosure, the structured light projection module includes a laser light source configured to emit a laser beam, and a diffractive optical element disposed downstream of an optical path of the laser light source to receive the laser beam and project the structured light.

According to an aspect of the disclosure, the structured light projection module and the camera module are disposed to be located in the same plane, with a first displacement $\Delta X$ in the horizontal direction, and a second displacement $\Delta Y$ in the vertical direction.

According to an aspect of the disclosure, for a structured light bright point on the longitudinal detection line, the image processing module determines a spatial position of an obstacle corresponding to the structured light bright point by:

$$\begin{cases} x = 0 \\ y = \dfrac{\Delta X * v}{u} - \Delta Y \\ z = \dfrac{\Delta X * f}{u} \end{cases}$$

wherein x, y and z are spatial position coordinates of the obstacle, f is a focal length of the camera module, and u and v are two-dimensional coordinates of the structured light bright point in the image.

According to an aspect of the disclosure, for a structured light bright point on the lateral detection line, the image processing module determines a spatial position of an obstacle corresponding to the structured light bright point by:

$$\begin{cases} x = \dfrac{\Delta Y * u}{v} - \Delta X \\ y = 0 \\ z = \dfrac{\Delta Y * f}{v} \end{cases}$$

wherein x, y and z are spatial position coordinates of the obstacle, f is a focal length of the camera module, and u and v are two-dimensional coordinates of the structured light bright point in the image.

According to an aspect of the disclosure, the first preset angle range is from −55° to +55° in the horizontal direction, the second preset angle range is from 8° to 16° in the vertical direction, the third preset angle range is from −8° to 0° in the vertical direction, and the fourth preset angle range is from −20° to +20° in the horizontal direction.

The disclosure further provides a mobile apparatus including the obstacle detection system as described above.

According to an aspect of the disclosure, the mobile apparatus is a ground-sweeping robot.

Preferred embodiments of the disclosure provide an obstacle detection system based on structured light, a mobile apparatus carrying the obstacle detection system, and a ground-sweeping robot. The obstacle detection system detects a higher obstacle within a large field of view on a path of travel by projecting a first lateral detection line in a horizontal direction; detects a suspension space below furniture such as a sofa or a cabinet by projecting a first longitudinal detection line in a vertical direction, thereby preventing the mobile apparatus from being stuck; and detects a low obstacle by projecting a second longitudinal detection line in the vertical direction, eliminating a blind zone caused when there is only a detection line in the horizontal direction; meanwhile, an elongated obstacle in the vertical direction can also be effectively detected with a plurality of longitudinal detection lines.

BRIEF DESCRIPTION OF THE DRAWINGS

The drawings are used to provide a further understanding of the present disclosure and constitute a part of the specification, and are used to explain the present disclosure along with the embodiments of the present disclosure, but do not constitute any limitation to the disclosure. In the drawings.

DETAILED DESCRIPTION

Figure 1:
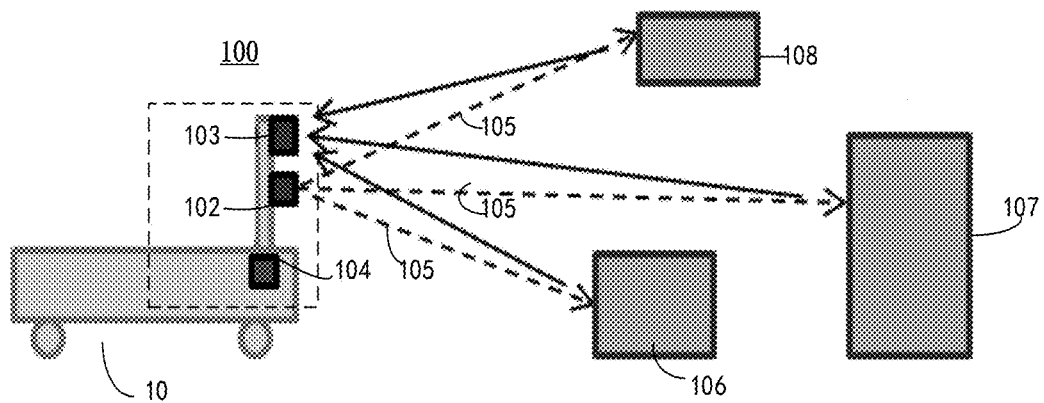
FIG. 1 schematically illustrates a working process of an obstacle detection system for a mobile apparatus according to a preferred embodiment of the disclosure.

Only certain exemplary embodiments will be briefly described below. As those skilled in the art will recognize, the described embodiments may be modified in various different ways without departing from the spirit or scope of the present disclosure. Therefore, the drawings and the following description are deemed essentially exemplary, and not limitative.

In the description of the present disclosure, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position relations as shown in the accompanying drawings, and are used only for the purpose of facilitating description of the present disclosure and simplification of the description, instead of indicating or suggesting that the denoted devices or elements must be oriented specifically, or configured or operated in a specific orientation. Thus, such terms should not be construed to limit the present disclosure. In addition, such terms as "first" and "second" are only used for the purpose of description, rather than indicating or suggesting relative importance or implicitly indicating the number of the denoted technical features. Accordingly, features defined with "first" and "second" may, expressly or implicitly, include one or more of the features. In the description of the present disclosure, "plurality" means two or more, unless otherwise defined explicitly and specifically.

In the description of the present disclosure, it needs to be noted that, unless otherwise specified and defined explicitly, such terms as "installation" "coupling" and "connection" should be broadly understood as, for example, fixed connection, detachable connection, or integral connection; or mechanical connection, electrical connection or intercommunication; or direct connection, or indirect connection via an intermediary medium; or internal communication between two elements or interaction between two elements. For those skilled in the art, the specific meanings of such terms herein can be construed in light of the specific circumstances.

Herein, unless otherwise specified and defined explicitly, if a first feature is "on" or "beneath" a second feature, this may cover direct contact between the first and second features, or contact via another feature therebetween, other than the direct contact. Furthermore, if a first feature is "on", "above", or "over" a second feature, this may cover the case that the first feature is right above or obliquely above the second feature, or just indicate that the level of the first feature is higher than that of the second feature. If a first feature is "beneath", "below", or "under" a second feature, this may cover the case that the first feature is right below or obliquely below the second feature, or just indicate that the level of the first feature is lower than that of the second feature.

The disclosure below provides many different embodiments or examples so as to realize different structures described herein. In order to simplify the disclosure herein, the following will give the description of the parts and arrangements embodied in specific examples. Of course, they are only for the exemplary purpose, not intended to limit the present disclosure. Besides, the present disclosure may repeat a reference number and/or reference letter in different examples, and such repeat is for the purpose of simplification and clarity, which does not represent any relation among various embodiments and/or arrangements as discussed. In addition, the present disclosure provides examples of various specific processes and materials, but those skilled in the art can also be aware of application of other processes and/or use of other materials.

The preferred embodiments of the present disclosure will be described below with reference to the drawings. It should be appreciated that the preferred embodiments described herein are only used to illustrate and explain the present disclosure, but not to limit the present disclosure.

According to a preferred embodiment of the disclosure, FIG. 1 schematically illustrates a mobile apparatus 10, on which an obstacle detection system 100 is mounted. As shown in FIG. 1, the obstacle detection system 100 includes a structured light projection module 102, a camera module 103, and an image processing module 104. In the travelling process of the mobile apparatus 10, the structured light projection module 102 projects a structured light 105 on a forward path of the mobile apparatus 10, the structured light 105 including at least one lateral detection line in a horizontal direction and at least one longitudinal detection line in a vertical direction. The structured light 105 is irradiated onto obstacles 106, 107 and 108 to form lateral or longitudinal bright lines. The camera module 103 captures the lateral or longitudinal bright lines, that is, an image of the structured light. The image processing module 104 communicates with the camera module 103 to receive the image of the structured light, and can calculate, according to the image of the structured light, the distances and positions of the obstacles 106, 107 and 108 on the forward path.

Figure 2:
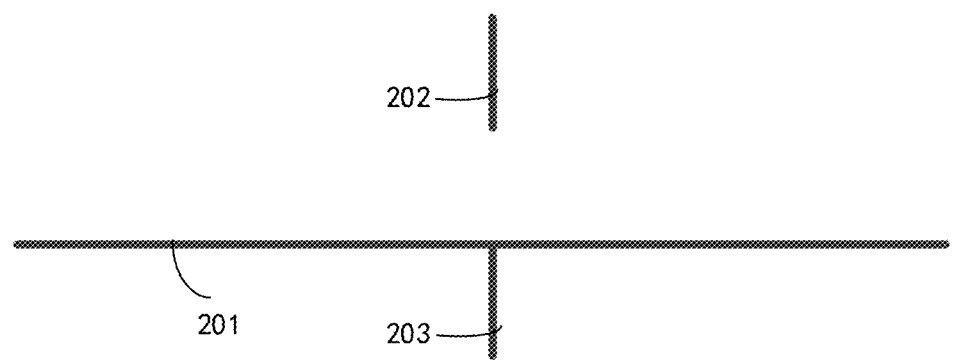
FIG. 2 illustrates a structured light projected by a structured light projection module according to a preferred embodiment of the disclosure.

According to a preferred embodiment of the disclosure, FIG. 2 illustrates one form of a pattern of the structured light 105 projected by the structured light projection module 102, that is, the pattern of the structured light 105 includes a first lateral detection line 201, a first longitudinal detection line 202 and a second longitudinal detection line 203. The structured light projection module 102 projects the first lateral detection line 201 according to a first preset angle range, and the zero degree in the horizontal direction is set directly in front of the structured light projection module 102. Preferably, the structured light projection module 102 projects the first lateral detection line 201 according to an angle range of −55° to +55° in the horizontal direction. The first lateral detection line 201 can be used to detect the higher obstacle 107 located within a large field of view on the path of travel of the mobile apparatus 10 (see FIG. 1).

Figure 3:
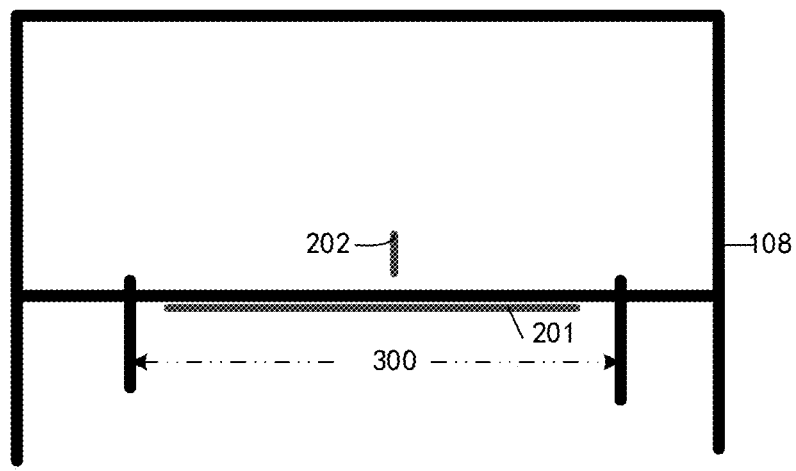
FIG. 3 schematically illustrates a detection of a suspension space below furniture by a structured light according to a preferred embodiment of the disclosure.

As shown in FIG. 2, the structured light projection module 102 projects the first longitudinal detection line 202 according to a second preset angle range, and the zero degree in the vertical direction is set directly in front of the structured light projection module 102. Preferably, the structured light projection module 102 projects the first longitudinal detection line 202 according to an angle range of 8° to 16° in the vertical direction, and the first longitudinal detection line 202 is located above the first lateral detection line 201. As shown in FIG. 3, with regard to a suspension space 300 below furniture such as sofa or a cabinet, the suspension space 300 is narrow, and the mobile apparatus 10 tends to be stuck after entering the suspension space 300; alternatively, in the case where a height of the suspension space 300 is lower than that of the mobile apparatus 10, the mobile apparatus 10, when travelling to the position of the suspension space 300, may be obstructed by the obstacle 108 above the suspension space 300 (e.g., an upper part of furniture such as a sofa or a cabinet). The first lateral detection line 201 is cast onto the suspension space 300 and cannot form an image, that is, the detection result is that there is no obstacle ahead, while the first longitudinal detection line 202 is cast onto the obstacle 108 above the suspension space 300 to form a longitudinal bright line. Then the image processing module 104 can determine, according to the longitudinal bright line, that there is the narrow suspension space 300 ahead, as well as the distance and position of the suspension space 300 relative to the mobile apparatus 10. Therefore, the first longitudinal detection line 202 is used for detecting the suspension space 300 below furniture such as a sofa or a cabinet, so as to avoid the mobile apparatus 10 from being stuck.

Figure 4:
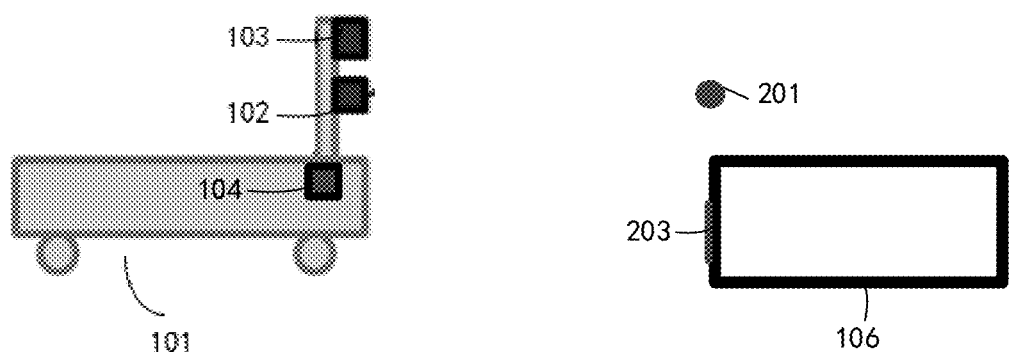
FIG. 4 schematically illustrates a detection of a low obstacle by a structured light according to a preferred embodiment of the disclosure.

Returning to FIG. 2, the structured light projection module 102 projects the second longitudinal detection line 203 according to a third preset angle range. Preferably, the structured light projection module 102 projects the second longitudinal detection line 203 according to an angle range of −8° to 0° in the vertical direction, and the second longitudinal detection line 203 is located below the first lateral detection line 201 and on an extension line of the first longitudinal detection line 202. The first lateral detection line 201 is used for detecting the higher obstacle 107 located within a large field of view on the path of travel of the mobile apparatus 10, but there is a blind zone with regard to the shorter obstacle 106. As shown in FIG. 4, with regard to the obstacle 106 having a height lower than a vertical distance between the structured light projection module 102 and the ground, the first lateral detection line 201 (a point perpendicular to the principal plane in FIG. 4) cannot be cast onto the obstacle 106 for imaging, that is, the detection result is that there is no obstacle ahead. The second longitudinal detection line 203 is cast onto the obstacle 106 to form a longitudinal bright line, and the image processing module 104 can determine, according to the longitudinal bright line, that there is the shorter obstacle 106 ahead, as well as the distance and position of the obstacle 106 relative to the mobile apparatus 10. Therefore, the second longitudinal detection line 203 is used for detecting the obstacle 106 having a height lower than the vertical distance between the structured light projection module 102 and the ground, eliminating the blind zone caused when there is only a detection line in the horizontal direction.

Returning to FIG. 2, the first lateral detection line 201 is used for detecting the higher obstacle 107 located within a large field of view on the path of travel of the mobile apparatus 10; the second longitudinal detection line 203 is located below the first lateral detection line 201 and on an extension line of the first longitudinal detection line 202, and is used for detecting the obstacle 106 having a height lower than the vertical distance between the structured light projection module 102 and the ground, eliminating the blind zone caused when there is only a detection line in the horizontal direction. Therefore, preferably, one end point of the second longitudinal detection line 203 intersects with the first lateral detection line 201. The first longitudinal detection line 202 is located above the first lateral detection line 201, and is used for detecting the suspension space 300 below furniture such as a sofa or a cabinet, avoiding the mobile apparatus from being stuck. Since the intensity of the light source of the obstacle detection system 100 is constant, and the limited intensity of the light source, in the case of a shorter total length of all the detection lines of the structured light, will be evenly distributed on the shorter detection line so as to enhance the brightness of the detection line and extend the detection distance, the first longitudinal detection line 202 is thus preferably spaced from the second longitudinal detection line 203, and there is no need to extend all the way upward from the first lateral detection line as long as an object above the suspension space can be detected. Obviously, a form of the connection between the first longitudinal detection line 202 and the second longitudinal detection line 203 also falls into the scope of protection of the disclosure.

According to a preferred embodiment of the disclosure, with regard to some vertical elongated obstacles located in the direction of travel, such as chair legs, the first lateral detection line 201 is cast onto an elongated obstacle to form an image approximate to a bright point, which is not easily recognized, while the first longitudinal detection line 202 and the second longitudinal detection line 203 are cast onto the elongated obstacle to form an image as a longitudinal bright line. After the camera module 103 captures the longitudinal bright line, the image processing module 104 may calculate, according to the image, the distance and position of the elongated obstacle on the forward path.

Figure 5:
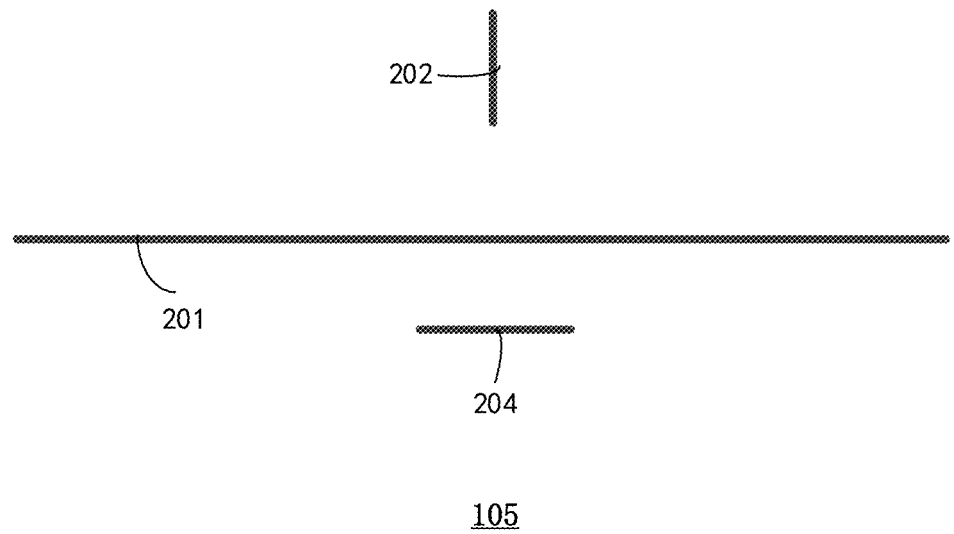
FIG. 5 illustrates a structured light projected by a structured light projection module according to a preferred embodiment of the disclosure.

According to a preferred embodiment of the disclosure, FIG. 5 illustrates another form of the pattern of the structured light 105 projected by the structured light projection module 102, that is, the pattern of the structured light 105 includes the first lateral detection line 201, the first longitudinal detection line 202 and a second lateral detection line 204. The structured light projection module 102 projects the first lateral detection line 201 according to the first preset angle range. Preferably, the structured light projection module 102 projects the first lateral detection line 201 according to an angle range of −55° to +55° in the horizontal direction. The structured light projection module 102 projects the first longitudinal detection line 202 according to the second preset angle range. Preferably, the structured light projection module 102 projects the first longitudinal detection line 202 according to an angle range of 8° to 16° in the vertical direction, and the first longitudinal detection line 202 is located above the first lateral detection line 201. The structured light projection module 102 projects the second lateral detection line 204 according to a fourth preset angle range. Preferably, the structured light projection module 102 projects the second lateral detection line 204 according to an angle range of −20° to +20° in the horizontal direction. The second lateral detection line 204 is located below and parallel to the first lateral detection line 201. The second horizontal detection line 204 can also be used for detecting the obstacle 106 having a height lower than the vertical distance between the structured light projection module 102 and the ground, eliminating the blind zone caused when there is only one detection line within a large field of view in the horizontal direction.

Figure 6:
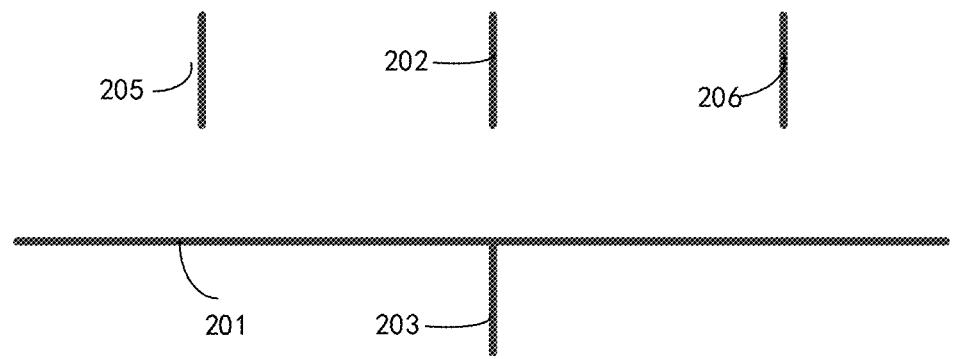
FIG. 6 illustrates a structured light projected by a structured light projection module according to a preferred embodiment of the disclosure.

According to a preferred embodiment of the disclosure, FIG. 6 illustrates another form of the structured light 105 projected by the structured light projection module 102, that is, the structured light 105 includes the first lateral detection line 201, the first longitudinal detection line 202, the second longitudinal detection line 203, a third longitudinal detection line 205 and a fourth longitudinal detection line 206. The structured light projection module 102 projects the first lateral detection line 201 according to the first preset angle range, and projects the first longitudinal detection line 202 according to the second preset angle range, the first longitudinal detection line 202 being located above the first lateral detection line 201 and at a lateral center of the first lateral detection line 201. The structured light projection module 102 projects the second longitudinal detection line 203 according to the third preset angle range, the second longitudinal detection line 203 being located below the first lateral detection line 201 and on an extension line of the first longitudinal detection line 202. The structured light projection module 102 also projects the third longitudinal detection line 205 and the fourth longitudinal detection line 206, the third longitudinal detection line 205 and the fourth longitudinal detection line 206 being parallel to the first longitudinal detection line 202 and located in symmetrical positions with the first longitudinal detection line 202 as an axis of symmetry. The third longitudinal detection line 205 and the fourth longitudinal detection line 206 are used for improving the detection probability of detecting an elongated obstacle (e.g., a chair leg or the like), and the suspension space below furniture such as a sofa or a cabinet.

Figure 7:
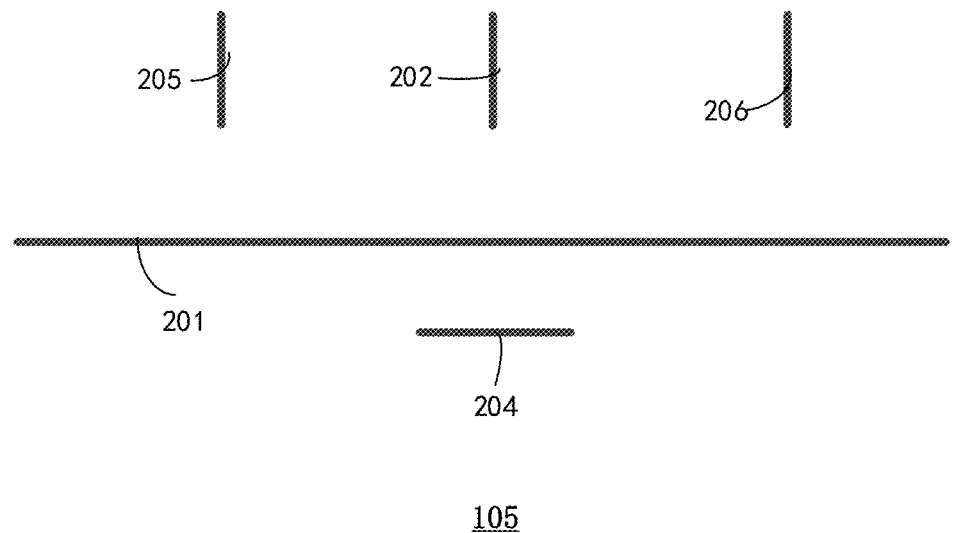
FIG. 7 illustrates a structured light projected by a structured light projection module according to a preferred embodiment of the disclosure.

According to one preferred embodiment of the disclosure, FIG. 7 illustrates another form of the pattern of the structured light 105 projected by the structured light projection module 102, that is, the pattern of the structured light 105 includes the first horizontal detection line 201, the first longitudinal detection line 202, the second lateral detection line 204, the third longitudinal detection line 205 and the fourth longitudinal detection line 206. The detection function of each detection line is the same as that in the aforesaid preferred embodiments, and will not be repeated here.

Figure 8:
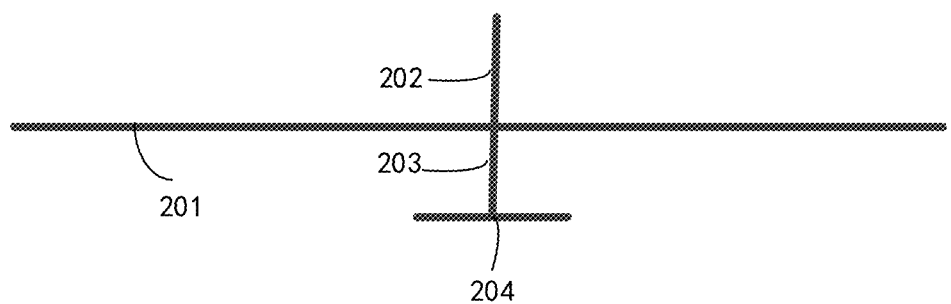
FIG. 8 illustrates a structured light projected by a structured light projection module according to a preferred embodiment of the disclosure.

FIG. 8 illustrates a pattern of the structured light 105 according to a preferred embodiment of the disclosure. As shown in FIG. 8, the pattern of the structured light 105 includes the first lateral detection line 201, the first longitudinal detection line 202, the second longitudinal detection line 203, and the second lateral detection line 204. The structured light projection module 102 projects the first lateral detection line 201 according to the first preset angle range, projects the first longitudinal detection line 202 according to the second preset angle range, projects the second longitudinal detection line 202 according to the third preset angle range, and projects the second lateral detection line 204 according to the fourth preset angle range, wherein the first longitudinal detection line 202 and the second longitudinal detection line 203 are aligned to each other and connected together, the second lateral detection line 204 intersects with a lower end point of the second longitudinal detection line 203 and is parallel to the first lateral detection line 201. Preferably, the structured light projection module 102 projects the first longitudinal detection line 202 according to an angle range of 0° to 16° in the vertical direction, and projects the second longitudinal detection line 203 according to an angle range of 0° to −8° in the vertical direction.

In the aforesaid preferred embodiments, various forms of the structured light 105 projected by the structured light projection module 102, i.e., any combination of multiple detection lines, all fall into the scope of protection of the disclosure.

According to a preferred embodiment of the disclosure, the structured light projection module 102 includes a laser light source configured to emit a laser beam, and a diffractive optical element (DOE) disposed downstream of an optical path of the laser light source to receive the laser beam and project the structured light 105 having a preset pattern.

Figure 9:
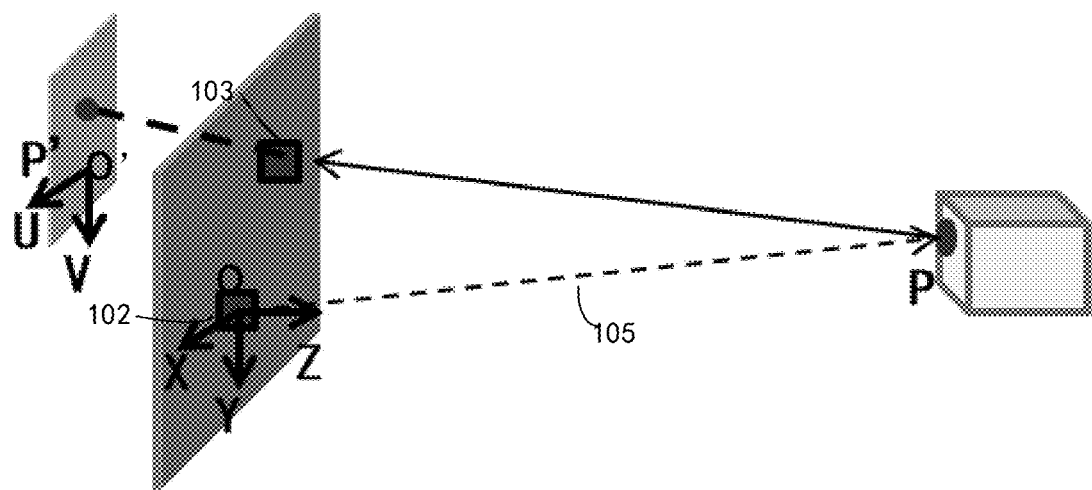
FIG. 9 illustrates establishments of a spatial coordinate system and a plane coordinate system of an obstacle detection system according to a preferred embodiment of the disclosure.
Figure 10:
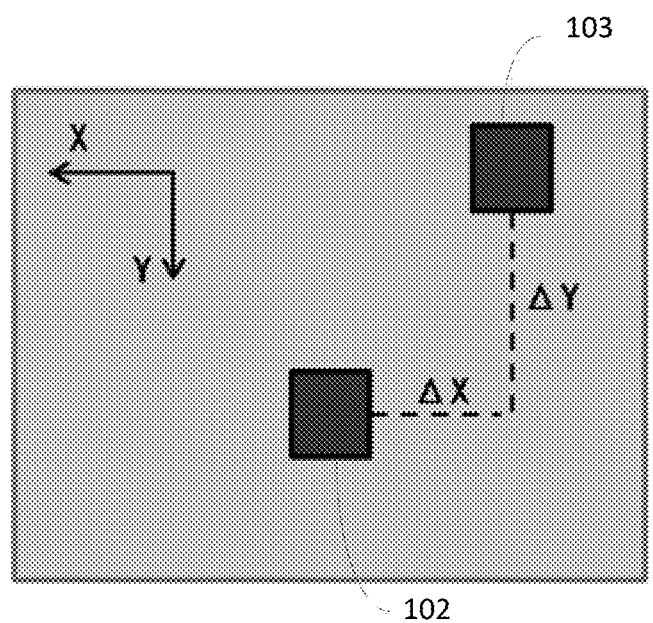
FIG. 10 illustrates a positional relationship between a structured light projection module and a camera module according to a preferred embodiment of the disclosure.

As shown in FIG. 9, the camera module 103 and the structured light projection module 102 are disposed to be located in the same plane, and there is a displacement of a certain distance therebetween in each of the horizontal and vertical directions. The displacement between the camera module 103 and the structured light projection module 102 in the horizontal direction is ΔX, and the displacement therebetween in the vertical direction is ΔY (as shown in FIG. 10). The camera module 103 has a lens group, the displacement between an equivalent optical center O″ of the lens group and a central light outlet O of the structured light projection module 102 in the horizontal direction being ΔX, and the displacement therebetween in the vertical direction being ΔY.

Taking the light outlet O of the structured light projection module 102 as the coordinate origin of a spatial coordinate system (X, Y, Z), where the Z axis is the travel direction of the mobile apparatus 10, the X axis is the horizontal direction, and the Y axis is the vertical direction. The structured light 105 emitted by the structured light projection module 102 is cast onto an obstacle to form a horizontal or vertical bright line. The position of any point of the bright line in the spatial coordinate system (X, Y, Z) is P (x, y, z). An image of the structured light 105 captured by the camera module 103 is imaged on the focal plane. Supposing an intersection point O′ between an optical axis of the lens group of the camera module 103 and the focal plane as the coordinate origin of a plane coordinate system (U, V), the imaging position of any point P (x, y, z) of the bright line in the plane coordinate system is P′ (u, v).

Figure 11:
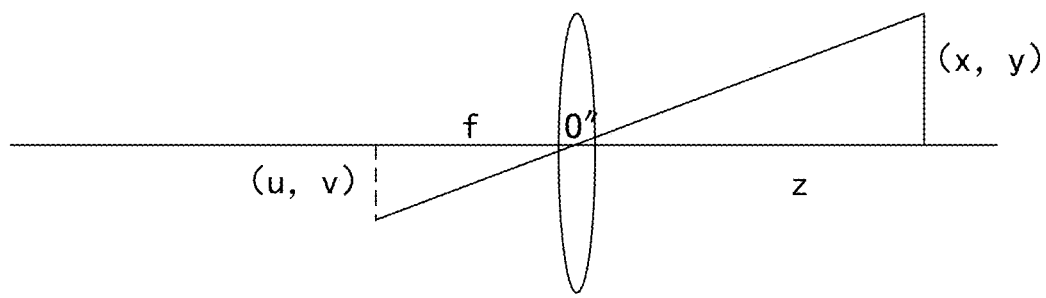
FIG. 11 illustrates a method for calculating spatial coordinates of an obstacle by an image processing module according to a preferred embodiment of the disclosure.

Now P (x, y, z) is used to represent the coordinates of any point on a lateral or longitudinal bright line in the spatial coordinate system, the bright line being formed by casting the structured light 105 onto the obstacle, while P′ (u, v) is used to represent the coordinates of the imaging position of P (x, y, z) on the focal plane of the camera module 103. As shown in FIG. 11, 0″ is an equivalent optical center of the camera module 103, an object distance is the distance of an obstacle along the travel direction of the mobile apparatus 10, i.e., z, and an image distance is approximately a focal length f of the lens group of the camera module 103.

Considering that the displacement between the equivalent optical center O″ of the lens group of the camera module 103 and the light outlet O of the structured light projection module 102 in the horizontal direction is ΔX, and the displacement therebetween in the vertical direction is ΔY, then in the obstacle detection system 100, with regard to a structured light bright point on a longitudinal detection line (e.g., the longitudinal detection line 202, 203, 205 or 206), the image processing module 104 determines a spatial position of an obstacle corresponding to the structured light bright point in the following manner:

$$\frac{u}{f} = \frac{x + \Delta X}{z}$$
$$\frac{v}{f} = \frac{y + \Delta Y}{z}$$
$$x = 0$$

y and z can be inversely solved by a simple and calculating-power-saving method:

$$\begin{cases} x = 0 \\ y = \dfrac{\Delta X * v}{u} - \Delta Y \\ z = \dfrac{\Delta X * f}{u} \end{cases}$$

With regard to a structured light bright point on a lateral detection line (e.g., the lateral detection line 201 or 204), the image processing module 104 determines a spatial position of an obstacle corresponding to the structured light bright point in the following manner:

$$\frac{u}{f} = \frac{x + \Delta X}{z}$$
$$\frac{v}{f} = \frac{y + \Delta Y}{z}$$
$$y = 0$$

x and z are inversely solved:

$$\begin{cases} x = \dfrac{\Delta Y * u}{v} - \Delta X \\ y = 0 \\ z = \dfrac{\Delta Y * f}{v} \end{cases}$$

The disclosure also provides a mobile apparatus 10 including the obstacle detection system 100 as described above. Preferably, the mobile apparatus is a ground-sweeping robot.

Figure 12:
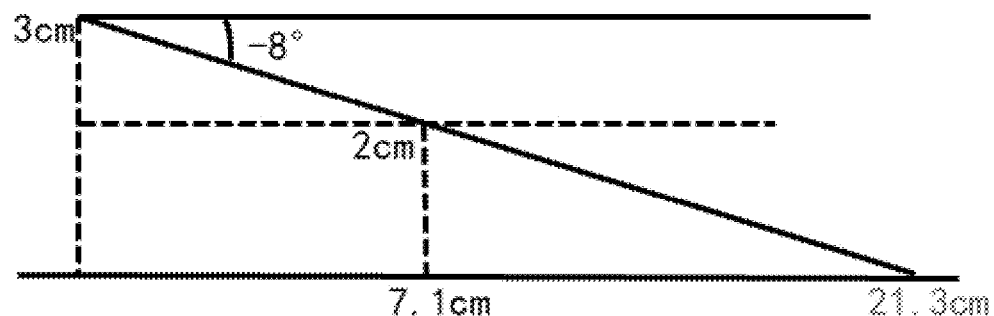
FIG. 12 illustrates detection ranges for a low obstacle and a suspension space according to a preferred embodiment of the disclosure.
Figure 12:
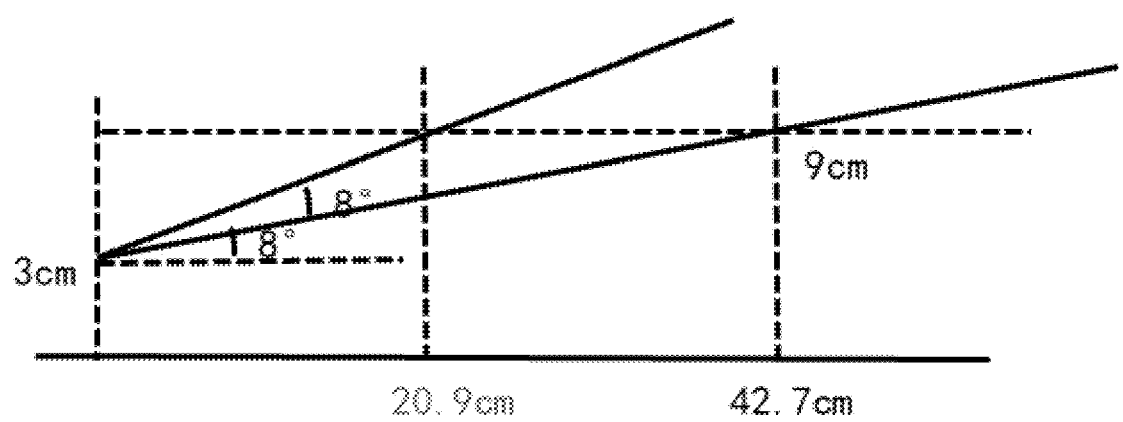

As shown in FIG. 12, according to a preferred embodiment of the disclosure, a ground-sweeping robot carrying the obstacle detection system 100 is provided, the structured light projection module 102 projecting the first lateral detection line 201 according to the angle range of −55° to +55° in the horizontal direction, projecting the first longitudinal detection line 202 according to the angle range of 8° to 16° in the vertical direction, and projecting the second longitudinal detection line 203 according to the angle range of −8° to 0° in the vertical direction. The height of the structured light projection module 102 from the ground is 3 cm, the displacement between the camera module 103 and the structured light projection module 102 in the horizontal direction is 1 cm, and the displacement therebetween in the vertical direction is 3 cm. According to the calculation:

1. The robot can achieve real-time positioning and map construction within a horizontal field of view of 110°, a distance of 6 meters, and a height of 3 cm, which may be done in coordination with the rotation of the robot to replace the laser radar function.

2. The robot can continuously recognize higher obstacles in the full field of view, e.g., elongated sofa legs, obstacles higher than 3 cm, and the like.

3. The robot can generally recognize a small and short object right ahead, for example, a short object with a height of 2 cm can be detected beyond 21.3 cm; the upper part of the small and short object can be detected within a range of 7.1 to 21.3 cm; and it cannot be detected within a distance of 7.1 cm, because it exceeds the lower detection limit of −8°.

4. With regard to a suspended obstacle right ahead, such as a sofa top with a height of 9 cm, it can be completely detected within a distance range of 20.9 cm to 42.7 cm; it cannot be detected in a distance range of less than 20.9 cm, because it is greater than the upper detection limit of 16°; and it cannot be completely detected in a distance range of greater than 42.7 cm, because it is less than the lower detection limit of 8°.

Preferred embodiments of the disclosure provide an obstacle detection system based on structured light, a mobile apparatus carrying the obstacle detection system, and a ground-sweeping robot. The obstacle detection system detects a higher obstacle within a larger field of view on a path of travel by projecting a first lateral detection line in a horizontal direction; detects a suspension space below furniture such as a sofa or a cabinet by projecting a first longitudinal detection line in a vertical direction, thereby preventing the mobile apparatus from being stuck; and detects a lower obstacle by projecting a second longitudinal detection line in the vertical direction, eliminating a blind zone caused when there is only a detection line in the horizontal direction; meanwhile, an elongated obstacle in the vertical direction can also be effectively detected with a plurality of longitudinal detection lines.

It should be noted finally that the contents described above are only preferred embodiments of the present disclosure, and are not used to limit the present disclosure. Although the detailed description of the present disclosure has been provided with reference to the foregoing embodiments, those skilled in the art may still make modifications to the technical solution as recited in each of the foregoing embodiments, or make equivalent replacements for some of the technical features therein. Any modification, equivalent replacement, or improvement, etc., made within the spirit and principles of the present disclosure, should be included in the protection scope of the present disclosure.

We claim:

1. An obstacle detection system for a mobile apparatus, comprising:
    a structured light projection module configured to project structured light on a forward path of the mobile apparatus, the structured light comprising at least one lateral detection line in a horizontal direction and at least one longitudinal detection line in a vertical direction, wherein the structured light projection module projects a first lateral detection line according to a first preset angle range, projects a first longitudinal detection line according to a second preset angle range, the first longitudinal detection line being located above the first lateral detection line, and the structured light projection module further projects at least one of a second longitudinal detection line according to a third preset angle range and a second lateral detection line according to a fourth preset angle range below the first lateral detection line;
    a camera module configured to capture an image of the structured light; and
    an image processing module configured to calculate a distance and a position of an obstacle on the forward path according to the image of the structured light, wherein the structured light projection module comprises a laser light source configured to emit a laser beam, and a diffractive optical element disposed downstream of an optical path of the laser light source to receive the laser beam and project the structured light.

2. The obstacle detection system according to claim 1, wherein the structured light projection module further projects the second longitudinal detection line according to the third preset angle range, the second longitudinal detection line being located below the first lateral detection line and on an extension line of the first longitudinal detection line.

3. The obstacle detection system according to claim 2, wherein one end point of the second longitudinal detection line intersects with the first lateral detection line, and the first longitudinal detection line is spaced from the second longitudinal detection line.

4. The obstacle detection system according to claim 1, wherein the structured light projection module further projects the second lateral detection line according to the fourth preset angle range, the second lateral detection line being located below and parallel to the first lateral detection line.

5. The obstacle detection system according to claim 1, wherein the structured light projection module further projects the second longitudinal detection line according to the third preset angle range, and projects the second lateral detection line according to the fourth preset angle range, wherein the first longitudinal detection line and the second longitudinal detection line are aligned to each other and connected together, the second lateral detection line intersects with a lower end point of the second longitudinal detection line and is parallel to the first lateral detection line.

6. The obstacle detection system according to claim 1, wherein the first longitudinal detection line is located at a lateral center of the first lateral detection line, and the structured light projection module further projects a third longitudinal detection line and a fourth longitudinal detection line, the third longitudinal detection line and the fourth longitudinal detection line being parallel to and disposed symmetrically relative to the first longitudinal detection line.

7. The obstacle detection system according to claim 1, wherein the structured light projection module and the camera module are disposed to be located in a same plane, with a first displacement $\Delta X$ in the horizontal direction, and a second displacement $\Delta Y$ in the vertical direction.

8. The obstacle detection system according to claim 7, wherein, for a structured light bright point on the longitudinal detection line, the image processing module determines a spatial position of an obstacle corresponding to the structured light bright point by:

$$\begin{cases} x = 0 \\ y = \dfrac{\Delta X * v}{u} - \Delta Y \\ z = \dfrac{\Delta X * f}{u} \end{cases},$$

wherein x, y and z are spatial position coordinates of the obstacle, f is a focal length of the camera module, and u and v are two-dimensional coordinates of the structured light bright point in the image.

9. The obstacle detection system according to claim 7, wherein, for a structured light bright point on the lateral detection line, the image processing module determines a spatial position of an obstacle corresponding to the structured light bright point by:

$$\begin{cases} x = \dfrac{\Delta Y * u}{v} - \Delta X \\ y = 0 \\ z = \dfrac{\Delta Y * f}{v} \end{cases},$$

wherein x, y and z are spatial position coordinates of the obstacle, f is a focal length of the camera module, and u and v are two-dimensional coordinates of the structured light bright point in the image.

10. The obstacle detection system according to claim 1, wherein the structured light projection module further projects the second longitudinal detection line according to the third preset angle range, and projects the second lateral detection line according to the fourth preset angle range, wherein the first preset angle range is from −55° to +55° in the horizontal direction, the second preset angle range is from 8° to 16° or from 0° to 16° in the vertical direction, the third preset angle range is from −8° to 0° in the vertical direction, and the fourth preset angle range is from −20° to +20° in the horizontal direction.

11. A mobile apparatus, comprising: an obstacle detection system, the obstacle detection system comprising:
   a structured light projection module configured to project structured light on a forward path of the mobile apparatus, the structured light comprising at least one lateral detection line in a horizontal direction and at least one longitudinal detection line in a vertical direction, wherein the structured light projection module projects a first lateral detection line according to a first preset angle range, projects a first longitudinal detection line according to a second preset angle range, the first longitudinal detection line being located above the first lateral detection line, and the structured light projection module further projects at least one of a second longitudinal detection line according to a third preset angle range and a second lateral detection line according to a fourth preset angle range below the first lateral detection line;
   a camera module configured to capture an image of the structured light; and
   an image processing module configured to calculate a distance and a position of an obstacle on the forward path according to the image of the structured light,
   wherein the structured light projection module comprises a laser light source configured to emit a laser beam, and a diffractive optical element disposed downstream of an optical path of the laser light source to receive the laser beam and project the structured light.

12. The mobile apparatus according to claim 11, wherein the mobile apparatus is a ground-sweeping robot.

13. The obstacle detection system according to claim 11, wherein the structured light projection module further projects the second longitudinal detection line according to the third preset angle range, the second longitudinal detection line being located below the first lateral detection line and on an extension line of the first longitudinal detection line, wherein one end point of the second longitudinal detection line intersects with the first lateral detection line, and the first longitudinal detection line is spaced from the second longitudinal detection line.

14. The obstacle detection system according to claim 11, wherein the structured light projection module further projects the second lateral detection line according to the fourth preset angle range, the second lateral detection line being located below and parallel to the first lateral detection line.

15. The obstacle detection system according to claim 11, wherein the structured light projection module further projects the second longitudinal detection line according to the third preset angle range, and projects the second lateral detection line according to the fourth preset angle range, wherein the first longitudinal detection line and the second longitudinal detection line are aligned to each other and connected together, the second lateral detection line intersects with a lower end point of the second longitudinal detection line and is parallel to the first lateral detection line.

16. The obstacle detection system according to claim 11, wherein the first longitudinal detection line is located at a lateral center of the first lateral detection line, and the structured light projection module further projects a third longitudinal detection line and a fourth longitudinal detection line, the third longitudinal detection line and the fourth longitudinal detection line being parallel to and disposed symmetrically relative to the first longitudinal detection line.

17. The obstacle detection system according to claim 11, wherein the structured light projection module and the camera module are disposed to be located in a same plane, with a first displacement ΔX in the horizontal direction, and a second displacement ΔY in the vertical direction.

18. The obstacle detection system according to claim 17, wherein, for a structured light bright point on the longitudinal detection line, the image processing module determines a spatial position of an obstacle corresponding to the structured light bright point by:

$$\begin{cases} x = 0 \\ y = \dfrac{\Delta X * v}{u} - \Delta Y \\ z = \dfrac{\Delta X * f}{u} \end{cases},$$

wherein x, y and z are spatial position coordinates of the obstacle, f is a focal length of the camera module, and u and v are two-dimensional coordinates of the structured light bright point in the image.

19. The obstacle detection system according to claim 18, wherein, for a structured light bright point on the lateral detection line, the image processing module determines a spatial position of an obstacle corresponding to the structured light bright point by:

$$\begin{cases} x = \dfrac{\Delta Y * u}{v} - \Delta X \\ y = 0 \\ z = \dfrac{\Delta Y * f}{v} \end{cases},$$

wherein x, y and z are spatial position coordinates of the obstacle, f is a focal length of the camera module, and u and v are two-dimensional coordinates of the structured light bright point in the image.

20. The obstacle detection system according to claim 11, wherein the structured light projection module further projects the second longitudinal detection line according to the third preset angle range, and projects the second lateral detection line according to the fourth preset angle range, wherein the first preset angle range is from −55° to +55° in the horizontal direction, the second preset angle range is from 8° to 16° or from 0° to 16° in the vertical direction, the third preset angle range is from −8° to 0° in the vertical direction, and the fourth preset angle range is from −20° to +20° in the horizontal direction.

* * * * *